(12) United States Patent
Ho et al.

(10) Patent No.: US 9,766,376 B2
(45) Date of Patent: Sep. 19, 2017

(54) OPTICAL FILM

(71) Applicant: TPK Touch Solutions (Xiamen) Inc., Xiamen (CN)

(72) Inventors: Kwan-Sin Ho, Miaoli (TW); Hua Yun, Xiamen (CN); Feng Zhao, Xiangtan (CN); Long Zeng, Putian (CN); I-Chung Hsu, Taipei (TW); Kuo-Shu Hsu, New Taipei (TW); Chunyong Zhang, Xiamen (CN); Yujun Lin, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 21 days.

(21) Appl. No.: 14/826,216

(22) Filed: Aug. 14, 2015

(65) Prior Publication Data
US 2016/0054479 A1    Feb. 25, 2016

(30) Foreign Application Priority Data
Aug. 21, 2014    (CN) .......................... 2014 1 0414526

(51) Int. Cl.
| | |
|---|---|
| *G02B 27/00* | (2006.01) |
| *G02B 1/118* | (2015.01) |
| *G02B 1/115* | (2015.01) |
| *G02B 5/02* | (2006.01) |
| *G02B 1/18* | (2015.01) |
| *G02B 1/111* | (2015.01) |

(52) U.S. Cl.
CPC ............. *G02B 1/118* (2013.01); *G02B 1/111* (2013.01); *G02B 1/115* (2013.01); *G02B 1/18* (2015.01); *G02B 5/0215* (2013.01); *G02B 5/0221* (2013.01)

(58) Field of Classification Search
CPC .......... G02B 1/118; G02B 1/111; G02B 1/18; G02B 5/0215; G02B 5/0221; G02B 1/115; G02B 1/11; G02B 27/0006; G02B 5/285; G02B 1/105; C03C 17/34
USPC ................................ 359/350, 507, 529, 601
See application file for complete search history.

(56) References Cited

U.S. PATENT DOCUMENTS

| | | | |
|---|---|---|---|
| 2013/0215497 A1* | 8/2013 | Chan .................... | G02B 5/0294 359/350 |
| 2013/0271836 A1* | 10/2013 | Fukaya .................... | G02B 1/11 359/507 |

\* cited by examiner

*Primary Examiner* — Scott J Sugarman
*Assistant Examiner* — Mustak Choudhury
(74) *Attorney, Agent, or Firm* — Cooper Legal Group, LLC

(57) ABSTRACT

An optical film includes a substrate, an anti-glare layer, a first anti-reflective layer and a second anti-reflective layer. The anti-glare layer is disposed on the substrate and has a microstructure disposed on a side of the anti-glare layer away from the substrate. The first anti-reflective layer is disposed on the microstructures of the anti-glare layer, and the anti-glare layer is located between the substrate and the first anti-reflective layer. The second anti-reflective layer is disposed on the first anti-reflective layer, and the first anti-reflective layer is located between the anti-glare layer and the second anti-reflective layer. A refractive index of the first anti-reflective layer is different from a refractive index of the anti-glare layer.

8 Claims, 2 Drawing Sheets

OPTICAL FILM

CROSS-REFERENCE TO RELATED APPLICATIONS

This non-provisional application claims priority under 35 U.S.C. §119(a) on Patent Application No(s). CN201410414526A filed in China on Aug. 21, 2014, the entire contents of Which are hereby incorporated by reference.

TECHNICAL FIELD

The disclosure relates to optical films, and more particularly to optical films with anti-glare and anti-reflective functions.

BACKGROUND

With the development of technology, touch panels are widely used in different kinds of electronic devices. In order to make the electronic device lighter in weight and smaller in size, traditional keyboards or keypads are omitted and replaced by the touch panel for users to instruct the electronic device. In short, the touch panel has become a critical part of the electronic device.

Accordingly, the quality of the touch panel is crucial to the electronic device. Thus, developers are dedicated to enhancing optical characteristics of the touch panel to be user-friendly. So far, the touch panel can comprise a stain-resistant layer disposed on a surface thereof in order to avoid stains remaining on the touch panel. On the other hand, the touch panel can comprise an anti-reflective layer to reduce reflection of light when the light travels through the touch panel. The touch panel also can comprise an anti-glare layer disposed on the anti-reflective layer to reduce glare from light when the light travels through the touch panel. However, since the anti-glare layer is superimposed on the anti-glare layer, the anti-glare layer may block a portion of light entering the anti-reflective layer, thereby reducing the transmittance of the anti-reflective layer. Consequently, the brightness is decreased and the functions of the anti-glare layer and the anti-reflective layer are both affected.

All in all, when different kinds of layers are disposed on the touch panel, each layer may affect the functions of other layers.

SUMMARY OF THE INVENTION

An aspect of the disclosure provides an optical film comprising a substrate, an anti-glare layer (anti-glare layer), a first anti-reflective layer (first anti-reflective layer) and a second anti-reflective layer (second anti-reflective layer). The anti-glare layer is disposed on the substrate and has a plurality of microstructures disposed on a side of the anti-glare layer away from the substrate. The first anti-reflective layer is disposed on the microstructures of the anti-glare layer, and the anti-glare layer is located between the substrate and the first anti-reflective layer. The second anti-reflective layer is disposed on the first anti-reflective layer, and the first anti-reflective layer is located between the anti-glare layer and the second anti-reflective layer. A refractive index of the first anti-reflective layer is different from a refractive index of the anti-glare layer.

BRIEF DESCRIPTION OF THE DRAWINGS

The present disclosure will become more fully understood from the detailed description given hereinbelow and the accompanying drawings which are given by way of illustration only and this are not limitative of the present disclosure and wherein.

DETAILED DESCRIPTION

Figure 1:
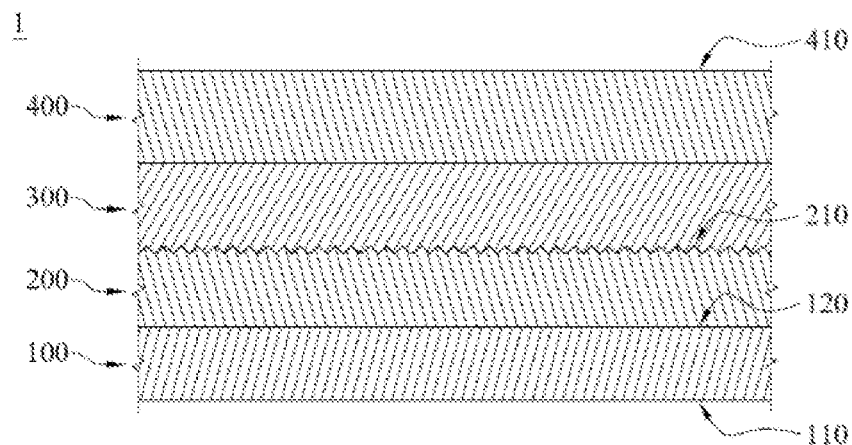
FIG. 1 is a partially sectional view of an optical film according to one or more embodiments of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure provides an optical film. The optical film can be attached to a surface of an object. For example, the object is a touch panel disposed on a display panel, hi other embodiments, the object is a touch panel. The optical film is used for protecting the object from exposure to an environment and has anti-glare and anti-reflective functions.

The following describes the optical film according to at least one embodiment of the disclosure. Please refer to FIG. 1, which is a partially sectional view of an optical film 1 according to one or more embodiments of the disclosure. The optical film 1 comprises, in order from bottom to top, a substrate 100, an anti-glare layer 200, a first anti-reflective layer 300 and a second anti-reflective layer 400. The anti-glare layer 200 is disposed on the substrate 100. The first anti-reflective layer 300 is disposed on the anti-glare layer 200, such that the anti-glare layer 200 is located between the substrate 100 and the first anti-reflective layer 300. The second anti-reflective layer 400 is located on the first anti-reflective layer 300, such that the first anti-reflective layer 300 is located between the anti-glare layer 200 and the second anti-reflective layer 400.

The substrate 100 is for carrying at least one film, such as the anti-glare layer 200, the first anti-reflective layer 300 and the second anti-reflective layer 400 in accordance with some embodiments. Moreover, the substrate 100 is for contacting the object, such as the display panel (not shown). Specifically, the substrate 100 has a first surface 110 and a second surface 120. The first surface 110 is for facing and contacting the object. The second surface 120 faces the anti-glare layer 200. In some embodiments, the substrate 100 is a glass which is pervious to light or comprises polyethylene terephthalate (PET), but the disclosure is not limited regarding the material of the substrate 100. When the substrate 100 is made of glass, its gloss is 150 degrees.

The anti-glare layer 200 has a plurality of microstructures 210 disposed on a side of the anti-glare layer 200 away from the second surface 200 of the substrate 100. The anti-glare layer 200 has an anti-glare function. In some embodiments, the anti-glare layer 200 comprises $SiO_2$. In some other embodiments, the anti-glare layer 200 comprises tetraethyl orthosilicate (TEOS), acid, alcohol, solvent and water. A thickness of the anti-glare layer 200 is less than about 100 nm. The anti-glare layer 200 is disposed on the substrate 100 by coating, painting or etching. As one non-limiting example, the gloss of the anti-glare layer 200 can be between about 115 to about 145 degrees.

The first anti-reflective layer 300 is disposed on the microstructures 210 of the anti-glare layer 200, and the second anti-reflective layer 400 is disposed on the first anti-reflective layer 300. Both the first anti-reflective layer 300 and the second anti-reflective layer 400 have anti-reflective, fingerprint-stain-resistance and stain-resistance functions. The second anti-reflective layer 400 has a first upper surface 410 located on a side of the second anti-reflective layer 400 facing away from the first anti-reflective layer 300. Also, the first upper surface 410 can be exposed to the outside of the optical film 1. Specifically, the first anti-reflective layer 300 is made from at least one of $SiO_2$, $Nb_2O_5$, $TiO_2$, $Ta_2O_5$, $SiO_xN_y$, $Si_3N_4$, $TiO_3O_5$, or the like. The second anti-reflective layer 400 is made from at least one of $SiO_2$, $MgF_2$, or the like, a total combined thickness of the first anti-reflective layer 300 and the second anti-reflective layer 400 can be between about 225 nanometers (nm) and about 255 nm. The first anti-reflective layer 300 and the second anti-reflective layer 400 can be disposed by painting, coating, deposition or sputtering, respectively. Moreover, when the gloss of the anti-glare layer 200 is between about 115 and about 145 degrees, a total combined transmittance of the anti-glare layer 200, the first anti-reflective layer 300 and the second anti-reflective layer 400 is about 95.6%. A surface roughness of the first anti-reflective layer 300 and a surface roughness of the second anti-reflective layer 400 can be less than about 0.025 μm. In this way, the reflection of light by the first anti-reflective layer 300 and the second anti-reflective layer 400 can be reduced, and the transmittance of the optical film 1 is enhanced. However, the disclosure is not limited to the above-mentioned materials, manufacturing methods, surface roughnesses and total combined thickness of the first anti-reflective layer 300 and the second anti-reflective layer 400, and these can be adjusted according to actual requirements.

It should be noted that a refractive index of the first anti-reflective layer 300 is different from a refractive index of the anti-glare layer 200. And in some embodiments, a refractive index of the first anti-reflective layer 300 is at least 0.1 greater than a refractive index of the anti-glare layer 200. That is, when travelling to an interface between the first anti-reflective layer 300 and the microstructures 210 of the anti-glare layer 200 from the second anti-reflective layer 400, light is scattered due to the difference of the refractive indices of the first anti-reflective layer 300 and the anti-glare layer 200 and the microstructures 210 being non-planar. In this way, the anti-glare function is achieved. In addition, the interface between the first anti-reflective layer 300 and the anti-glare layer 200 can scatter light from the substrate 100, such as light emitted by the display panel or exterior light reflected by the substrate 100. In some embodiments, the refractive index of the first anti-reflective layer 300 is greater than the refractive index of the anti-glare layer 200, thereby enhancing the anti-glare function of the optical film 1.

Furthermore, the first anti-reflective layer 300 and the anti-glare layer 200 can be made from different materials such that the refractive indices of the first anti-reflective layer 300 and the anti-glare layer 200 are different.

In some embodiments, the refractive index of the first anti-reflective layer 300 is greater than a refractive index of the second anti-reflective layer 400. With this arrangement, the anti-reflective function is improved. In some embodiments, the refractive index of the first anti-reflective layer is greater than about 1.8, and the refractive index of the second anti-reflective layer is less than about 1.5. With this arrangement of the refractive indices, the anti-glare function of the optical film 1 is improved.

Moreover, in other embodiments, the optical film 1 comprises at least three anti-reflective layers to enhance anti-reflective capability. The disclosure is not limited to the number of anti-reflective layers, and the number can be altered in accordance with actual requirements.

According to the above-mentioned configurations of the embodiments, the substrate 100, the anti-glare layer 200, the first anti-reflective layer 300 and the second anti-reflective layer 400 are sequentially disposed on one another. The anti-glare layer 200 and the first anti-reflective layer 300 have different refractive indices, and the microstructures 210 are located between the anti-glare layer 200 and the first anti-reflective layer 300. With this arrangement, the independent and original function of anti-glare of the anti-glare layer 200 and the independent and original functions of the first anti-reflective layer 300 and the second anti-reflective layer 400 are not affected by other layers. Therefore, the functions of anti-glare and anti-reflective of the optical film can be maintained.

Figure 2:
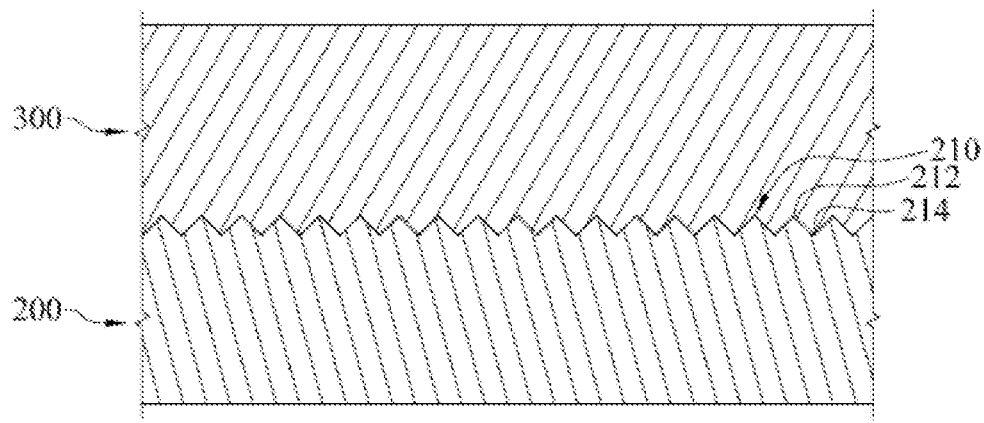
FIG. 2 is a partially sectional view of an anti-glare layer and a first anti-reflective layer of the optical film according to some embodiments of the disclosure.

The following introduces the interface between the anti-glare layer 200 and the first anti-reflective layer 300, please refer to FIG. 1 and FIG. 2. FIG. 2 is a partially sectional view of the anti-glare layer and the first anti-reflective layer of the optical film according to some embodiments of the disclosure.

In some embodiments, the microstructures 210 of the anti-glare layer 200 have a plurality of protrusions 212 and a plurality of recesses 214. The recesses 214 are respectively formed between two of the protrusions 212, which are adjacent to each other. A portion of the first anti-reflective layer 300 is located on the recesses 214. The surface roughness of the microstructures 210 is less than about 0.25 μm. In some embodiments, the surface roughness of the microstructures 210 is less than about 0.035 μm, and the surface roughness can be adjusted according to actual requirements. In other words, when the first anti-reflective layer 300 is prepared to be disposed on the anti-glare layer 200, a portion of the first anti-reflective layer 300 is filled with accommodation spaces formed in the recesses 214 then the other portion of the first anti-reflective layer 300 is disposed on the protrusions 212. As shown in FIG. 2, it is clearly shown that there are a plurality of interfaces between the microstructures 210 and the first anti-reflective layer 300 and facing in different directions. When travelling to the interfaces, light, can be greatly scattered. Furthermore, in some embodiments, the microstructures 210 are cone-shaped, i.e., triangular pyramid, but the disclosure is not limited as to the shape of the microstructures 210.

Figure 3:
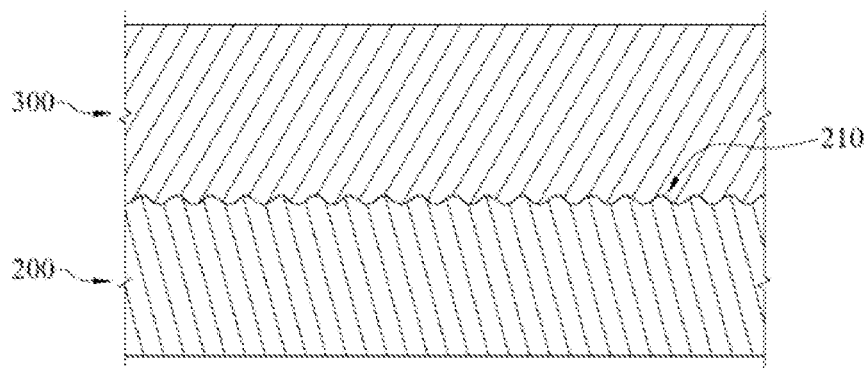
FIG. 3 is a partially sectional view of an anti-glare layer and a first anti-reflective layer of an optical film according to some embodiments of the disclosure.

The following describes other shapes of the microstructures 210. Please refer to FIG. 3, Which is a partially sectional view of an anti-glare layer and a first anti-reflective layer of an optical film according to some embodiments of the disclosure. In some embodiments, the microstructures 210 are beads, which also enhance the anti-glare function.

Figure 4:
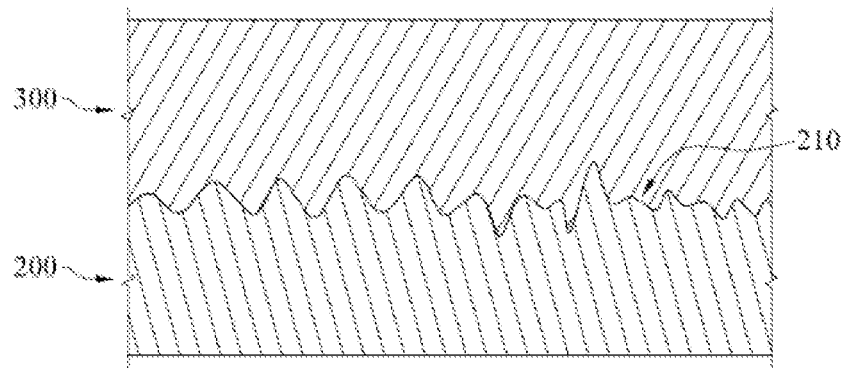
FIG. 4 is a partially sectional view of an anti-glare layer and a first anti-reflective layer of an optical film according to some embodiments of the disclosure.

Please refer to FIG. 4, which is a partially sectional view of an anti-glare layer and a first anti-reflective layer of an optical film according to some embodiments of the disclosure. In some embodiments, the Shapes of the microstructures 210 are irregular. The microstructures 210 with irregular shapes can increase different refractive and reflective directions of light when the light travels to the two layers with different refractive indices. Thus, this kind of microstructure 210 enhances the scattering of light.

Figure 5:
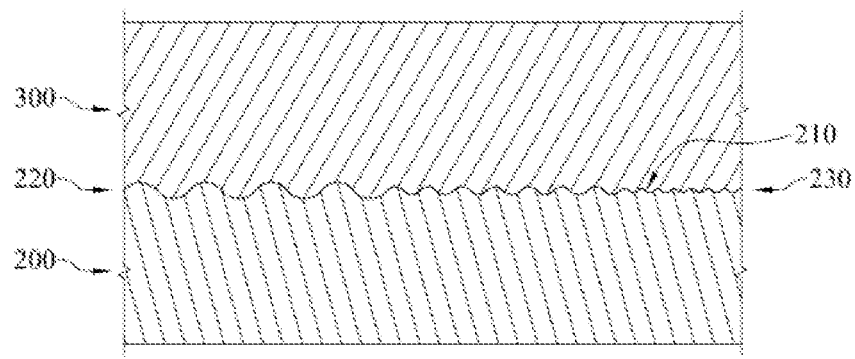
FIG. 5 is a partially sectional view of an anti-glare layer and a first anti-reflective layer of an optical film according to some embodiments of the disclosure.

Please refer to FIG. 5, which is a partially sectional view of an anti-glare layer and a first anti-reflective layer of an optical film according to some embodiments of the disclosure. In some embodiments, the anti-glare layer 200 has a first side 220 and a second side 230 that are opposite to each other, and sizes of the microstructures 210 are decreased along a direction from the first side toward the second side. Thus, this kind of configuration with microstructures having sizes adjusted in accordance with a certain direction can enhance the scattering of light in certain directions or orientations.

Figure 6:
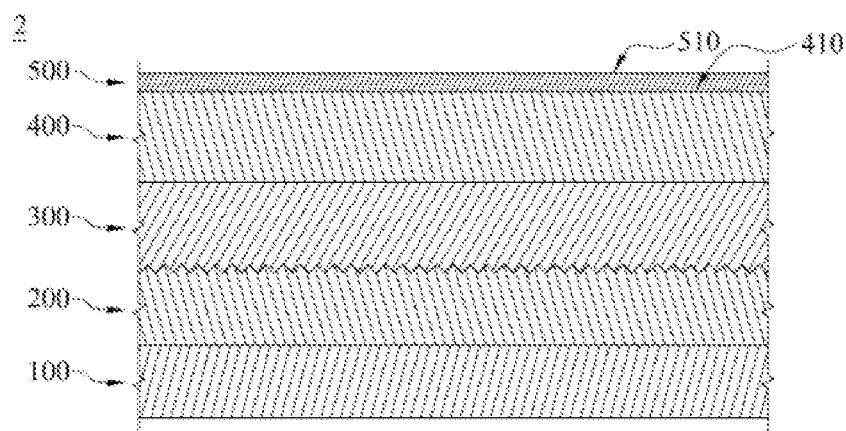
FIG. 6 is a partially sectional view of an optical film according to some embodiments of the disclosure.

Please refer to FIG. 6, which is a partially sectional view of an optical film according to some embodiments of the disclosure. In some embodiments, an optical film 2 further comprises a stain-resistance layer 500 disposed on the first upper surface 410 of the second anti-reflective layer 400. In other words, the second anti-reflective layer 400 is located between the first anti-reflective layer 300 and the stain-resistance layer 500. The stain-resistance layer 500 has a second upper surface 510 located on a side of the stain-resistance layer 500 facing away from the second anti-reflective layer 400. The second upper surface 510 can face or expose to the outside of the optical film 2. The stain-resistance layer 500 can be disposed on the second anti-reflective layer 400 by painting, coating, deposition or sputtering. Moreover, the stain-resistance layer 500 can comprise Polydimethylsiloxane (PDMS), and/or perfluoropolyethers (PFPFs). When the stain-resistance layer 500 is the material having characteristic of being hydrophobic, the stain-resistance layer 500 can resist stains and wet. Moreover, a thickness of the stain-resistance layer 500 is between about 18 and about 25 nm, but the disclosure is not limited to the above-mentioned materials and thicknesses.

To sum up, in the optical film according to the embodiments of the disclosure, the anti-glare layer is located between the substrate and the first anti-reflective layer, the microstructures of the anti-glare layer face the first anti-reflective layer, and the refractive index of the anti-glare layer is different from the refractive index of the first anti-reflective layer. Therefore, the optical film with the anti-glare layer and the first anti-reflective layer has anti-glare and anti-reflective functions at the same time. Moreover, the optical film can have high transmittance.

In some embodiments, the optical film can further comprise a stain-resistance layer disposed on the second anti-reflective layer for resisting stains and smudges.

What is claimed is:

1. An optical film, comprising:
   a substrate;
   an anti-glare layer disposed on the substrate and having a plurality of microstructures disposed on a side of the anti-glare layer away from the substrate,
   wherein:
   the microstructures have a plurality of protrusions and a plurality of recesses,
   the recesses are formed between the protrusions, respectively,
   the anti-glare layer has a first side and a second side diametrically opposite the first side, and
   sizes of the plurality of protrusions decrease along a direction from the first side toward the second side;
   a first anti-reflective layer disposed on the microstructures of the anti-glare layer, wherein the anti-glare layer is located between the substrate and the first anti-reflective layer, and a portion of the first anti-reflective layer is disposed in the recesses; and
   a second anti-reflective layer disposed on the first anti-reflective layer, wherein the first anti-reflective layer is located between the anti-glare layer and the second antireflective layer, and a refractive index of the first anti-reflective layer is different from a refractive index of the anti-glare layer.

2. The optical film according to claim 1, wherein the refractive index of the first anti-reflective layer is greater than the refractive index of the anti-glare layer.

3. The optical film according to claim 1, wherein the refractive index of the first anti-reflective layer is greater than about 1.8, and a refractive index of the second anti-reflective layer is less than about 1.5.

4. The optical film according to claim 1, wherein the refractive index of the first anti-reflective layer is greater than a refractive index of the second anti-reflective layer.

5. The optical film according to claim 1, wherein the anti-glare layer comprises $SiO_2$, the first anti-reflective layer is made from at least one of $SiO_2$, $Nb_2O_5$, $TiO_2$, $Ta_2O_5$, $SiO_xN_y$, $Si_3N_4$, $Ti_3O_5$, or the like, and the second anti-reflective layer is made from at least one of $SiO_2$, $MgF_2$, or the like.

6. The optical film according to claim 1, further comprising a stain-resistant layer disposed on the second anti-reflective layer, wherein the second anti-reflective layer is located between the first anti-reflective layer and the stain-resistant layer.

7. The optical film according to claim 1, wherein a total thickness of the first anti-reflective layer and the second anti-reflective layer is between about 225 nanometers (nm) and about 255 nm, and a thickness of the anti-glare layer is less than about 100 nm.

8. The optical film according to claim 1, wherein shapes of the microstructures are irregular.

* * * * *